United States Patent
Ito (10) Patent No.: US 9,567,885 B2
(45) Date of Patent: Feb. 14, 2017

(54) HONEYCOMB STRUCTURE

(71) Applicant: NGK Insulators, Ltd., Nagoya (JP)

(72) Inventor: Mitsuhiro Ito, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 41 days.

(21) Appl. No.: 14/633,612

(22) Filed: Feb. 27, 2015

(65) Prior Publication Data

US 2015/0252702 A1    Sep. 10, 2015

(30) Foreign Application Priority Data

Mar. 4, 2014  (JP) .................................. 2014-041375

(51) Int. Cl.
*B01D 46/24* (2006.01)
*F01N 3/022* (2006.01)
(Continued)

(52) U.S. Cl.
CPC ......... *F01N 3/0222* (2013.01); *B01D 46/2418* (2013.01); *B01D 46/2429* (2013.01); *B01D 46/2444* (2013.01); *C04B 28/24* (2013.01); *C04B 35/565* (2013.01); *C04B 37/005* (2013.01); *C04B 38/0006* (2013.01); *C04B 41/009* (2013.01); *C04B 41/5089* (2013.01); *C04B 41/85* (2013.01);
(Continued)

(58) Field of Classification Search
None
See application file for complete search history.

(56) References Cited

U.S. PATENT DOCUMENTS 7,964,263 B2 * 6/2011 Kodama ............ B01D 46/2448
                                                         428/116
2005/0076626 A1    4/2005 Kudo et al.
(Continued)

FOREIGN PATENT DOCUMENTS

EP    2 133 198 A1    12/2009
WO    03/067041 A1    8/2003
(Continued)

OTHER PUBLICATIONS

Extended European Search Report (Application No. 15157402.7) dated Sep. 4, 2015.

*Primary Examiner* — David Sample
*Assistant Examiner* — Nicholas W Jordan
(74) *Attorney, Agent, or Firm* — Burr & Brown, PLLC (57) ABSTRACT

There is provided a honeycomb structure where a crack at a honeycomb substrate is reduced. A honeycomb structure has a honeycomb substrate that has a porous partition wall defining a plurality of cells extending from an inflow end face as one end face to an outflow end face as another end face and becoming channels for a fluid, and an outer circumference coating layer disposed at an outer circumference of the honeycomb substrate. At 25 to 800° C., a thermal expansion coefficient of the outer circumference coating layer is larger than a thermal expansion coefficient of the honeycomb substrate. The thermal expansion coefficients of the outer circumference coating layer and the thermal expansion coefficient at 25 to 800° C. preferably meet a relationship represented by the expression: 1.1<(the thermal expansion coefficient of the outer circumference coating layer/the thermal expansion coefficient of the honeycomb substrate)<40.

4 Claims, 1 Drawing Sheet

(51) Int. Cl.
*C04B 28/24* (2006.01)
*C04B 35/565* (2006.01)
*C04B 37/00* (2006.01)
*C04B 38/00* (2006.01)
*C04B 41/85* (2006.01)
*C04B 41/00* (2006.01)
*C04B 41/50* (2006.01)
*C04B 111/00* (2006.01)
*C04B 111/32* (2006.01)
*C04B 111/34* (2006.01)

(52) U.S. Cl.
CPC ........... *B01D 2046/2496* (2013.01); *C04B 2111/0081* (2013.01); *C04B 2111/00793* (2013.01); *C04B 2111/32* (2013.01); *C04B 2111/343* (2013.01); *C04B 2235/9607* (2013.01); *C04B 2237/062* (2013.01); *C04B 2237/083* (2013.01); *C04B 2237/09* (2013.01); *C04B 2237/341* (2013.01); *C04B 2237/346* (2013.01); *C04B 2237/36* (2013.01); *C04B 2237/365* (2013.01); *Y10T 428/24149* (2015.01)

(56) References Cited

U.S. PATENT DOCUMENTS

| | | |
|---|---|---|
| 2005/0109023 A1 | 5/2005 | Kudo et al. |
| 2005/0255288 A1* | 11/2005 | Noguchi ............ C04B 38/0006 428/116 |
| 2008/0241015 A1 | 10/2008 | Kudo et al. |
| 2008/0248238 A1 | 10/2008 | Tomita et al. |
| 2009/0041975 A1 | 2/2009 | Kodama et al. |
| 2012/0110965 A1 | 5/2012 | Cai et al. |
| 2012/0186211 A1 | 7/2012 | Kudo et al. |
| 2014/0319742 A1 | 10/2014 | Pyzik et al. |

FOREIGN PATENT DOCUMENTS

| | | |
|---|---|---|
| WO | 2007/069674 A1 | 6/2007 |
| WO | 2007/116665 A1 | 10/2007 |
| WO | 2008/126485 A1 | 10/2008 |
| WO | 2011/008462 A1 | 1/2011 |
| WO | 2013/090214 A2 | 6/2013 |

\* cited by examiner

HONEYCOMB STRUCTURE

The present application is an application based on JP 2014-041375 filed on Mar. 4, 2014 with Japan Patent Office, the entire contents of which are incorporated herein by reference.

BACKGROUND OF THE INVENTION

Field of the Invention

The present invention relates to a honeycomb structure. More specifically, the present invention relates to the honeycomb structure where generation of a crack in a honeycomb substrate can be reduced.

Description of Related Art

Conventionally, a filter has been used to capture and remove a particulate matter (particulates) contained in exhaust gas exhausted from, for example, a diesel engine, and/or to purify the exhaust gas with a catalyst.

This filter is constituted of a pillar-shaped honeycomb structure that has a partition wall defining a plurality of cells extending from one end face to the other end face to be channels for the exhaust gas. That is, the exhaust gas that flows in from the one end face to the inside of the honeycomb structure is purified by passing through the inside of the partition wall or the like.

As such honeycomb structure, there is known a honeycomb structures where, for example, a plurality of honeycomb segments are monolithically (integrally) bonded with bonding layers and have an outer circumference coating layer at its outer periphery (for example, see Patent Documents 1 to 4).

[Patent Document 1] WO2003/067041
[Patent Document 2] WO2007/069674
[Patent Document 3] WO2007/116665
[Patent Document 4] WO2008/126485

SUMMARY OF THE INVENTION

When the honeycomb structures disclosed in Patent Documents 1 to 4 are repeatedly heated and cooled by a regeneration process or the like, this possibly causes a failure, generation of a crack in honeycomb substrates constituting the honeycomb structure.

More specifically, conventionally, in the honeycomb structure that has an outer circumference coating layer, the relationship between the thermal expansion coefficient of the outer circumference coating layer and the thermal expansion coefficient of the honeycomb substrate has been set (predetermined) as follows. That is, the thermal expansion coefficient of the outer circumference coating layer has been set same as the thermal expansion coefficient of the honeycomb substrate, or set smaller than the thermal expansion coefficient of the honeycomb substrate. It has been considered that such setting increased a thermal shock resistance.

However, even if the thermal expansion coefficient of the outer circumference coating layer and the thermal expansion coefficient of the honeycomb substrate have been set as described above, a crack may be generated in the honeycomb substrate during regeneration process of a diesel particulate filter (DPF). In short, by repeated heating and cooling in the regeneration process or the like, crack may be generated in the honeycomb substrate constituting the honeycomb structure. Therefore, a development of the honeycomb structure where the crack generation in the honeycomb substrate is restricted during the DPF regeneration has been highly desired.

The present invention has been developed in view of the above-mentioned problems, and the object thereof is to provide a honeycomb structure where generation of a crack in a honeycomb substrate can be reduced.

To solve the above-mentioned problems, according to the present invention, the following honeycomb structure is provided.

According to a first aspect of the present invention, a honeycomb structure comprising a honeycomb substrate that has a porous partition wall defining a plurality of cells is provided, the cells extending from an inflow end face as one end face to an outflow end face as another end face and becoming channels for a fluid, and an outer circumference coating layer disposed at an outer circumference of the honeycomb substrate, wherein at 25 to 800° C., a thermal expansion coefficient of the outer circumference coating layer is larger than a thermal expansion coefficient of the honeycomb substrate.

According to a second aspect of the present invention, the honeycomb structure according to the first aspect is provided, wherein the thermal expansion coefficient of the outer circumference coating layer and the thermal expansion coefficient of the honeycomb substrate at 25 to 800° C. meet a relationship represented by the Expression: 1.1<(the thermal expansion coefficient of the outer circumference coating layer/the thermal expansion coefficient of the honeycomb substrate)<40.

According to a third aspect of the present invention, the honeycomb structure according to the first or second aspects is provided, wherein the outer circumference coating layer contains mica, or the outer circumference coating layer contains alumina and at least one kind selected from the group consisting of alumina fiber, calcined mica and bio-soluble fiber.

According to a fourth aspect of the present invention, the honeycomb structure according to any one of the first to third aspects is provided, wherein the honeycomb substrate contains at least one kind selected from the group consisting of silicon carbide, alumina titanate, silicon nitride and cordierite.

In the honeycomb structure of the present invention, at 25 to 800° C., the thermal expansion coefficient of the outer circumference coating layer is larger than the thermal expansion coefficient of the honeycomb substrate, allowing reduction of generation of a crack in the honeycomb substrates constituting the honeycomb bonded assembly.

DETAILED DESCRIPTION OF THE INVENTION

Next, a mode for carrying out the present invention will be described in detail with reference to the drawings. It should be understood that the present invention is not limited to the following embodiments and that design change, improvement, and the like may be suitably added on the basis of ordinary knowledge of a person skilled in the art without departing from the gist of the present invention.

Figure 1:
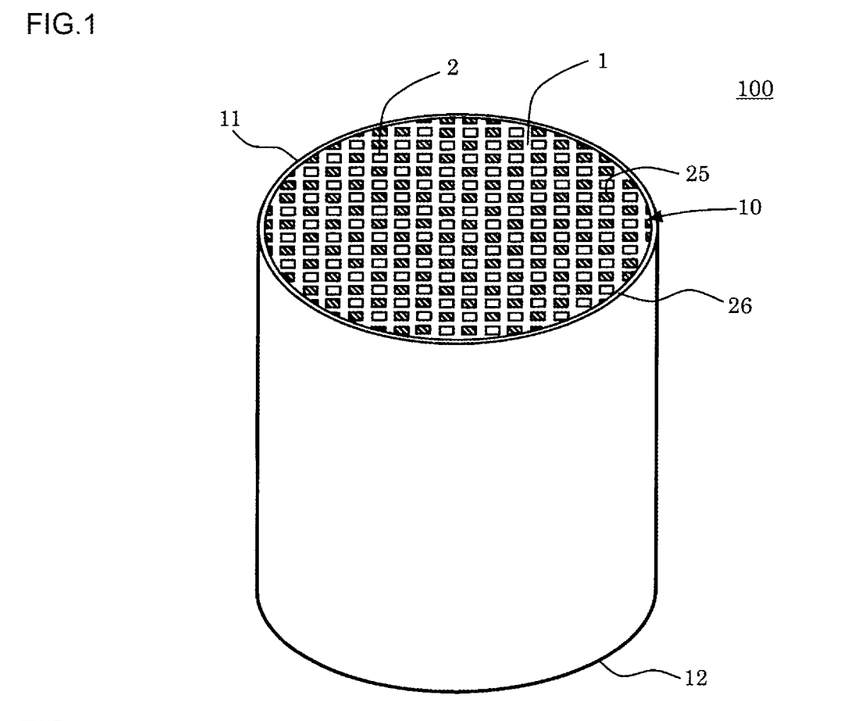
FIG. 1 is a perspective view schematically showing one embodiment of a honeycomb structure according to the present invention.
Figure 2:
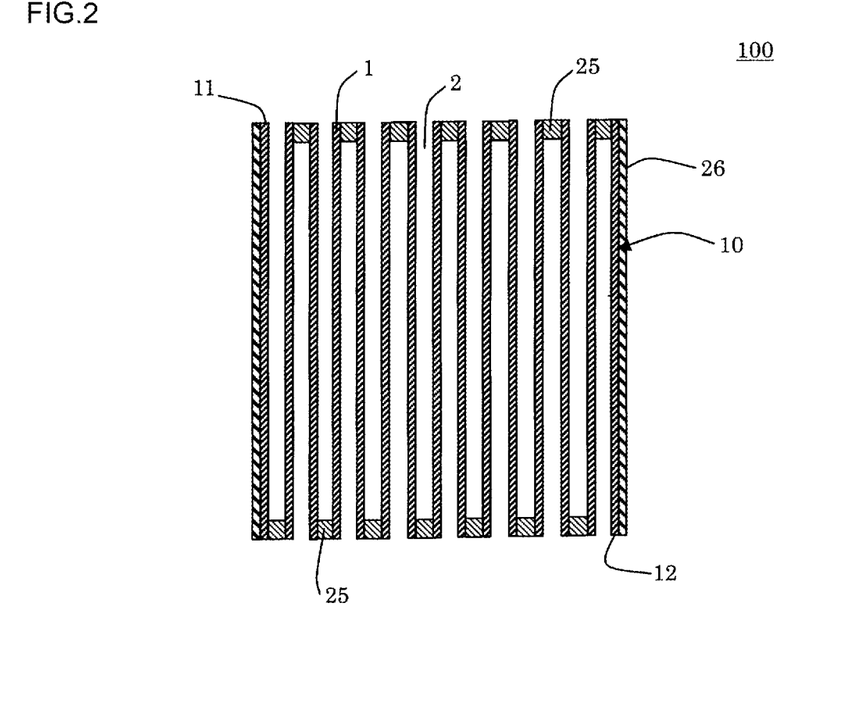
FIG. 2 is a cross-sectional view of one embodiment of the honeycomb structure according to the present invention schematically showing a cross section parallel to a cell extending direction.

(1) Honeycomb Structure:

A honeycomb structure of one embodiment of the present invention is a pillar-shaped honeycomb structure 100 as shown in FIG. 1 and FIG. 2. That is, the honeycomb structure 100 has a pillar-shaped honeycomb substrate 10 and an outer circumference coating layer 26 disposed on an outer circumference of this honeycomb substrate 10. The honeycomb substrate 10 has a porous partition wall 1 defining a plurality of cells 2 extending from an inflow end face 11 which is one end face, to an outflow end face 12 which is the other end face, and forming channels for a fluid. In the honeycomb structure 100, in a range of 25 to 800° C., the thermal expansion coefficient of the outer circumference coating layer 26 is larger than the thermal expansion coefficient of the honeycomb substrate 10.

FIG. 1 is a perspective view schematically showing one embodiment of a honeycomb structure according to the present invention. FIG. 2 is a cross-sectional view schematically showing a cross section parallel to a cell extending direction in one embodiment of the honeycomb structure according to the present invention.

In this honeycomb structure 100, at 25 to 800° C., the thermal expansion coefficient of the outer circumference coating layer 26 is larger than the thermal expansion coefficient of the honeycomb substrate 10. This allows the honeycomb structure 100 to reduce a crack in the honeycomb substrate 10. That is, when increasing the thermal expansion coefficient of the outer circumference coating layer 26 compared with the thermal expansion coefficient of the honeycomb substrate 10, only a pressure (subtracted pressure) resulting from the difference obtained by subtracting a value of the thermal expansion coefficient of the honeycomb substrate from a value of the thermal expansion coefficient of the outer circumference coating layer is applied to the honeycomb substrate in the DPF regeneration. In a state where the honeycomb structure is canned (housed) in a can body, the subtracted pressure is generated in a direction of tightening (clamping) the honeycomb substrate. Accordingly, the stress generated in the honeycomb substrate is only the subtracted pressure, thus reducing stress generated in the honeycomb substrate. As a result, with the honeycomb structure 100 of the present invention, generation of a crack can be suppressed in the honeycomb substrate.

In other words, with the honeycomb structure 100, the thermal expansion coefficient of the outer circumference coating layer 26 is larger than the thermal expansion coefficient of the honeycomb substrate 10 at 25 to 800° C., thereby reducing the stress generated in the honeycomb substrate 10 during the DPF regeneration. That is, by tightening the honeycomb substrate 10 with the outer circumference coating layer 26 in overheating, "thermal stress generated in the honeycomb substrate 10" and "stress of tightening the honeycomb substrate 10 with the outer circumference coating layer 26" act in the opposite directions so that the stresses are counterbalanced. In addition, the honeycomb structure 100 is used in a state where it is housed (canned) in the can body and secured (canning state), therefore, an expanding force of the outer circumference coating layer 26 becomes a force tightening the honeycomb substrate 10. Since the thermal stress and the "stress of tightening" act in the opposite directions with each other, the crack in the honeycomb substrate 10 can be reduced during the DPF regeneration.

Further, due to the reduced generation of the crack in the honeycomb substrate 10 during the DPF regeneration, an amount of soot that can trapped by "the honeycomb structure functioning as a filter" can be increased. Thus, with the honeycomb structure of the present invention, it is achieved to increase the amount of trappable soot by focusing on the thermal expansion coefficient of the outer circumference coating layer and the thermal expansion coefficient of the honeycomb substrate. This allows further increasing the amount of trappable soot by the combination use with the conventionally-known technique that increases the amount of trappable soot by improving a property of the honeycomb substrate.

When the honeycomb structure of the present invention is used as filter for an engine such as diesel engine, the amount of trappable soot can be increased as described above, thereby timing for regenerating of the filter can be postponed. Consequently, the use of the honeycomb structure of the present invention improves fuel consumption.

The "thermal expansion coefficient of the outer circumference coating layer at 25 to 800° C." is a value measured as follows. That is, first, the outer circumference coating layer is cut out a sample of length 1.5 mm×width 15 mm×thickness 0.5 mm, and using this sample, measurement was performed with a thermal dilatometer. The sample is heated to 25 to 800° C., and a difference (Δl) in the thermal expansion coefficients between the sample and a standard sample in the thermal expansion coefficient is calculated. However, a speed of a temperature rise at 25° C. and 800° C. is set to 10° C./minute or less. Afterwards, the thermal expansion coefficient (coefficient of thermal expansion, CTE) is obtained from the Expression (1) below. In this manner, the thermal expansion coefficient of the outer circumference coating layer is calculated. Quartz is used as the "standard sample." As the thermal dilatometer, for example, a thermal expansion coefficient measuring apparatus (TD5000S) available from MAC Science Corporation can be used. It is acceptable that a part of a honeycomb substrate remains at the cut-out sample, however, note that the sample is adjusted such that the remaining "part of a honeycomb substrate" does not touch with the thermal dilatometer. In the case where the outer circumference coating layer is at the thickness of less than 0.5 mm, the sample is cut out at a maximum thickness that can be taken out.

$$CTE = \frac{\Delta l}{\Delta t \times L} + Cs \qquad (1)$$

In Expression (1), CTE (/° C.) means "thermal expansion coefficient." Δl (mm) means a "difference in the thermal expansion coefficient between the sample and the standard sample." Δt means a "temperature difference between the temperatures at the start of measurement and the end of the measurement," specifically, 800° C.−25° C.=775° C. L means an "overall length of the sample," specifically, 15 mm. Cs (/° C.) means the "thermal expansion coefficient of the standard sample."

The "thermal expansion coefficient of the honeycomb substrate at 25 to 800° C." is a value measured as follows. That is, first, similar to the "thermal expansion coefficient of the outer circumference coating layer at 25 to 800° C.", the sample of length 3.5 mm×width 15 mm×thickness 3.5 mm is cut out from the honeycomb substrate. Next, similar to the measurement of the thermal expansion coefficient of the outer circumference coating layer, measurement is performed. Thus, the thermal expansion coefficient of the honeycomb substrate is calculated.

With the honeycomb structure 100, the thermal expansion coefficient of the outer circumference coating layer 26 and the thermal expansion coefficient of the honeycomb substrate 10 at 25 to 800° C. preferably have a relationship represented by Expression: 1.1<(the thermal expansion coefficient of the outer circumference coating layer 26/the thermal expansion coefficient of the honeycomb substrate 10)<40. If the value is equal to or more than the upper limit of the above relational expression, in a process of loading the honeycomb structure with a catalyst and/or in the case of using the honeycomb structure as filter, the possibility of damaging the honeycomb substrate due to the outer circumference coating layer is increased.

With the honeycomb structure 100, the thermal expansion coefficient of the outer circumference coating layer 26 and the thermal expansion coefficient of the honeycomb substrate 10 at 25 to 800° C. further preferably have a relationship represented by Expression: 1.3<(the thermal expansion coefficient of the outer circumference coating layer 26/the thermal expansion coefficient of the honeycomb substrate 10)<6. Meeting this relationship eases a temperature control in a production process of the filters (honeycomb structures) and a process of causing the honeycomb structure to load the catalyst (catalyst loading process). That is, by avoiding the stress due to the difference in thermal expansion coefficient and the crack in the outer circumference coating layer in the processes, heating and cooling can be speeded up, allowing a reduction in the number of processes.

(1-1) Honeycomb Substrate:

The honeycomb substrate 10 has a plugging portion 25 disposed at ends on the inflow end face 11 side of predetermined cells among the plurality of cells 2 and disposed at ends on the outflow end face 12 side of the residual cells (cells other than the predetermined cells). These plugging portions 25 are arranged at the respective inflow end face 11 and outflow end face 12 such that the predetermined cells and the residual cells are alternately arranged, forming a so-called check pattern.

The honeycomb substrate 10 preferably contains at least one kind selected from the group consisting of silicon carbide, alumina titanate, silicon nitride and cordierite.

When the honeycomb substrate has the plugging portion, the material of the plugging portion is also preferably the same material as the material of the honeycomb substrate.

There is not any special restriction on a shape of the honeycomb substrate 10, and examples of the shape can include a pillar shape or cylindrical shape with a round bottom surface (round cylindrical shape), a cylindrical shape with an oval bottom surface (elliptic cylindrical shape), and a pillar shape or cylindrical shape with a polygonal bottom surface (quadrangular shape, pentagonal shape, hexagonal shape, heptagonal shape, octagonal shape, and the like) (prismatic pillar shape or prismatic columnar shape).

As to the size of the honeycomb substrate 10, the area of the bottom surface is preferably from 2000 to 100000 mm$^2$, and further preferably from 4000 to 10000 mm$^2$. Furthermore, the length of the honeycomb substrate 10 (honeycomb structure 100) in the cell extending direction is preferably from 50 to 200 mm, and further preferably from 75 to 150 mm.

A porosity of the partition wall 1 of the honeycomb substrate 10 is preferably from 35 to 65%, and further preferably from 40 to 60%. The porosity of less than 35% may increase a deformation at the firing. The porosity of more than 65% may degrade the strength of the honeycomb structure. The porosity is a value measured with the mercury porosimeter.

An average pore diameter of the partition wall 1 of the honeycomb substrate 10 is preferably from 2 to 15 μm and further preferably from 4 to 8 μm. The average pore diameter of less than 2 μm may increase the pressure loss after coating (applying) the catalyst. The average pore diameter of more than 15 μm may degrade trapping performance. The average pore diameter is a value measured with the mercury porosimeter.

The thickness of the partition wall 1 of the honeycomb substrate 10 is preferable to be 100 to 450 μm and further preferable to be 150 to 320 μm. The thickness of the partition wall 1 of less than 100 μm may result in insufficient strength as a structure. The thickness of the partition wall 1 of more than 450 μm may increase the pressure loss.

A cell density of the honeycomb substrate 10 is preferable to be 15 to 60/cm$^2$ and further preferable to be 30 to 50/cm$^2$. The cell density of less than 15/cm$^2$ may result in insufficient strength as a structure. The cell density of more than 60/cm$^2$ may increase the pressure loss.

With the honeycomb substrate 10, the shape of the cells 2 at the cross section perpendicular to the direction in which the cell 2 extends is preferable to be a quadrangular shape, a hexagonal shape, an octagonal shape, or a combination of these shapes. By forming the cells in the shape as described, the pressure loss is decreased when exhaust gas is flown through the honeycomb structure 100.

(1-2) Outer Circumference Coating Layer:

The honeycomb structure of the present invention is preferable to meet the following conditions. That is, at 25 to 800° C., the thermal expansion coefficient of the outer circumference coating layer is larger than the thermal expansion coefficient of the honeycomb substrate. At 25 to 800° C., the thermal expansion coefficient of the outer circumference coating layer and the thermal expansion coefficient of the honeycomb substrate preferably meet the following expression.

Expression: 1.1<(the thermal expansion coefficient of the outer circumference coating layer/the thermal expansion coefficient of the honeycomb substrate)<40

The outer circumference coating layer preferably contains mica, or the outer circumference coating layer preferably contains alumina and at least one kind selected from the group consisting of alumina fiber, calcined mica and bio-soluble fiber. The outer circumference coating layer preferably contains alumina and at least one kind selected from the group consisting of alumina silicate fiber, alumina fiber, calcined mica and bio-soluble fiber.

More specifically, in the case where the maximum temperature of the filter during regeneration is 1200° C. or less, the outer circumference coating layer preferably contains the mica. The reason is because the mica is an anisotropic mineral featuring excellent thermal resistance and excellent chemical resistance, thereby the outer circumference coating layer is excellent in the thermal resistance and the chemical resistance.

In the case where the maximum temperature of the filter during regeneration is more than 1200° C., the outer circumference coating layer preferably contains alumina and at least one kind selected from the group consisting of alumina fiber, calcinated mica, and bio-soluble fiber. This is to further increase the thermal expansion coefficient.

The "bio-soluble fiber" is a fiber that has a property of being dissolved in a living body and specifically is calcium silicate fiber, magnesia silicate fiber, or the like.

The thickness of the outer circumference coating layer is preferable to be 0.0 to 6000 μm and further preferable to be 200 to 1000 μm. Designing the thickness of the outer circumference coating layer within the range allows successful reduction of generation of the crack in the honeycomb substrate. The thickness of the outer circumference coating layer is measured using a vernier caliper or a light gauge, and is a value (thickness) found by multiplying an average value of a difference in an outer diameter of the honeycomb structure between before and after forming the outer circumference coating layer by ½ (average value×1/2).

(1-3) Honeycomb Bonded Assembly:

The honeycomb substrate may be constituted of one structure as shown in FIG. 1, or the honeycomb substrate may be constituted of a plurality of honeycomb substrates (to form a honeycomb bonded assembly). Specifically, the honeycomb bonded assembly has a plurality of pillar-shaped honeycomb segments, and a bonding layer bonding side surfaces of the plurality of honeycomb segments one another.

In the case where the honeycomb substrate is constituted of the honeycomb bonded assembly, the number of honeycomb segments constituting the honeycomb bonded assembly, can be appropriately determined to, for example, 4 to 100. As a constitution of combining the honeycomb segments, for example, four cells in length×four cells in width or five cells in length×five cells in width can be employed.

The shape of the plurality of honeycomb segments may differ between one honeycomb segment and other honeycomb segments or may be the same. As the shape of the honeycomb segment, specifically, the shape of the cross section perpendicular to the cell extending direction can be a polygonal (quadrangular shape, pentagonal shape, hexagonal shape, heptagonal shape, octagonal shape, and the like) pillar.

The honeycomb segment preferably contains at least one kind selected from the group consisting of silicon carbide, alumina titanate, silicon nitride, and cordierite.

In the case where the honeycomb substrate is constituted of the honeycomb bonded assembly, the bonding layer and the honeycomb segment preferably meet the following conditions. That is, at 25 to 800° C., the thermal expansion coefficient of the bonding layer is larger than the thermal expansion coefficient of the honeycomb segment, and at 25 to 800° C., the thermal expansion coefficient of the bonding layer of the honeycomb bonded body and the thermal expansion coefficient of the outer circumference coating layer preferably meet the following expression.

Expression: 0.7<(the thermal expansion coefficient of the outer circumference coating layer/the thermal expansion coefficient of the bonding layer)

When the bonding layer and the outer circumference coating layer have the relationship meeting the expression above, in a heating process of the outer circumference coating material and/or in the catalyst loading process, the outer circumference coating layer is less likely to be cracked. If the value is equal to or less than the lower limit of the expression, the outer circumference coating layer may be cracked, resulting in a leakage of the applied catalyst.

With the honeycomb structure of the present invention, at 25 to 800° C., the thermal expansion coefficient of the bonding layer of the honeycomb bonded assembly and the thermal expansion coefficient of the outer circumference coating layer more preferably meet the following expression. Then, when the bonding layer and the outer circumference coating layer have the relationship meeting the following expression, in the heating process of the outer circumference coating material and the process of loading the catalyst, the outer circumference coating layer is less likely to be cracked.

Expression: 0.7<(the thermal expansion coefficient of the outer circumference coating layer/the thermal expansion coefficient of the bonding layer) <1.5

The bonding layer preferably contains mica, or the bonding layer preferably contains alumina and at least one kind selected from the group consisting of alumina fiber, calcined mica and bio-soluble fiber.

More specifically, in the case where the maximum temperature of the filter during regeneration is 1200° C. or less, the bonding layer preferably contains the mica. This is because the mica is an anisotropic mineral having excellent thermal resistance and excellent chemical resistance, thereby the bonding layer is excellent in the thermal resistance and the chemical resistance.

In the case where the maximum temperature of the filter during regeneration is more than 1200° C., the bonding layer preferably contains alumina and at least one kind selected from the group consisting of alumina fiber, calcined mica, and bio-soluble fiber. This is to further increase the thermal expansion coefficient.

The "bio-soluble fiber" is a fiber that has a property of being dissolved in a living body and specifically is calcium silicate, magnesia silicate, or the like.

The thickness of the bonding layer is preferable to be 100 to 3000 μm and further preferable to be 500 to 1500 μm. Designing the thickness of the bonding layer within the range allows successful reduction of generation of the crack in the honeycomb segment (honeycomb substrate). The thickness of the bonding layer is a thickness at the thickest part of the layer.

The total area of the bonding layer at a cross section perpendicular to the cell extending direction of the honeycomb structure is preferable to be 0.5 to 15% of the total area of the honeycomb bonded assembly and further preferable to be 2 to 8%. By the total area of the bonding layer within the range, generation of the crack in the honeycomb segment (honeycomb substrate) can be more successfully reduced.

The isostatic strength of the honeycomb structure 100 is preferable to be 1 MPa or more and further preferable to be 3 MPa or more. The isostatic strength preferably has a larger value, however, when a material, a structure and the like of the honeycomb structure 100 are taken into consideration, an upper limit is approximately 6 MPa. When the isostatic strength is less than 1 MPa, the honeycomb structure may be easily damaged during use of the honeycomb structure as the catalyst carrier or the like. The isostatic strength is a value measured under application of a hydrostatic pressure on the honeycomb structure in water.

(2) Method for Manufacturing Honeycomb Structure:

Next, the following describes the method for manufacturing the honeycomb structure of the present invention.

(2-1) Fabrication of Honeycomb Formed Body:

First, the honeycomb formed body is fabricated by the following method. A honeycomb forming raw material is prepared by mixing a binder, a surfactant, a pore former, water, and others. This honeycomb forming raw material preferably contains at least one kind selected from the group consisting of silicon carbide, alumina titanate, silicon nitride and cordierite. This honeycomb forming raw material also preferably contains a cordierite forming raw material, which becomes the cordierite after being fired.

Next, the honeycomb forming raw material is kneaded to form a kneaded material. There is not any special restriction on a method of kneading the honeycomb forming raw material to form the kneaded material, and an example of the method can be a method in which a kneader, a vacuum pugmill, etc. is used.

Next, the kneaded material is extruded to fabricate a honeycomb formed body. The honeycomb formed body has a structure that has the partition wall defining a plurality of cells to be channels for a fluid.

Next, the obtained honeycomb formed body (honeycomb substrate) is preferably dried. The honeycomb formed body after drying may be referred to as a "honeycomb dried body." There is not any special restriction on a drying method. The honeycomb formed body may be degreased after the drying.

The honeycomb formed body (when dried, the honeycomb dried body) is preferably fired (obtains a honeycomb fired body). As a firing condition, heating is preferably performed at 1400 to 1500° C. in an inert atmosphere such as argon for 1 to 20 hours. Moreover, after the firing, an oxidation treatment (oxygenation treatment) is preferably performed at 1200 to 1350° C. for one to ten hours. Thus, the oxidation treatment improves durability of the honeycomb structure.

(2-3) Formation of Outer Circumference Coating Layer:

Next, the outer circumference coating layer is formed at the outer circumference of the honeycomb formed body. An outer circumference coating material for forming the outer circumference coating layer is initially prepared. The outer circumference coating material can be fabricated by mixing and kneading inorganic particles, a binder, a surfactant, a pore former, water, and others. The outer circumference coating material preferably contains mica, or the outer circumference coating material preferably contains alumina and at least one kind selected from the group consisting of alumina fiber, calcined mica and bio-soluble fiber.

As the binder, methylcellulose, hydroxypropyl methylcellulose, hydroxypropoxyl cellulose, hydroxyethyl cellulose, carboxymethylcellulose, polyvinyl alcohol, or the like can be used. Among these materials, the combination use of the methylcellulose and the hydroxypropoxyl cellulose is preferable. A content of the binder is preferable to be 3 to 20 parts by mass with respect to 100 parts by mass of the inorganic particles.

The content of water is preferable to be 10 to 45 parts by mass with respect to 100 parts by mass of the inorganic particles.

As the surfactant, ethylene glycol, dextrin, fatty acid soap, polyalcohol, or the like can be used. One of these surfactants may be used alone, or a combination of two or more of the surfactants may be used. The content of the surfactant is preferable to be 1 to 10 parts by mass with respect to 100 parts by mass of the inorganic particles.

There is not any special restriction for the pore former, as long as pores (air holes) are formed after the firing, and examples of a pore former include graphite, starch, a foamable resin, a water absorbable resin, and silica gel. The content of the pore former is preferable to be 0 to 20 parts by mass with respect to 100 parts by mass of the inorganic particles.

Afterwards, the outer circumference coating material prepared as described above is applied over the outer peripheral surface of the honeycomb dried body. The method for applying the outer circumference coating material is not especially limited, and, for example, the outer circumference coating material can be applied with a spatula. Then, the outer circumference coating material of the honeycomb dried body where the outer circumference coating material has been applied, is dried to form an outer circumference coating layer.

EXAMPLES

Hereinafter, the present invention will further specifically be described with examples, but the present invention is not limited to these examples.

Example 1

SiC powder and metal Si powder were mixed at a mass ratio of 80:20, a starch and foamable resin were added to the powder as a pore-forming additive, and further methylcellulose, hydroxypropoxylmethyl cellulose, a surfactant and water were added to obtain a fictile (plastic) kneaded material.

Next, the obtained kneaded material was extruded into a honeycomb shape, thus obtaining a honeycomb formed body. Next, the obtained honeycomb formed body was dried at 120° C., thus obtaining a dried honeycomb body (honeycomb segment formed body).

Plugging portions were formed in this honeycomb segment formed body, by plugging (sealing) one end of predetermined cells and the other end of the residual cells were sealed such that both end faces each had a check pattern. That is, the adjacent cells were sealed so as to be sealed at the ends on the opposite side from one another. As a plugging material for forming the plugging portions, the material similar to the honeycomb segment raw material was used. Then, after drying the honeycomb segment formed body (after obtaining the honeycomb dried body), the honeycomb segment formed body was degreased at 400° C. in air atmosphere, and afterwards the honeycomb segment formed body was fired under the Ar inert atmosphere at 1450° C., and SiC crystal particles were combined (bonded) with Si. Thus, the honeycomb segment (honeycomb fired body) with a porous structure was obtained. These honeycomb segments were fabricated by 500 pieces. The size of the honeycomb segment was length 36 mm×width 36 mm×depth 152 mm.

Next, 20 parts by mass of mica, 45 parts by mass of SiC, 35 parts by mass of colloidal silica, and as a superaddition, of 1 part by mass of carboxymethylcellulose, 1 part by mass porinon, 1 part by mass of foamable resin, and of 25 parts by mass of water were kneaded with a mixer. Thus, a paste-like bonding material was prepared.

Next, the bonding materials were applied over the side surfaces of the respective honeycomb fired bodies, and 16 honeycomb fired bodies out of the above-mentioned fabricated 500 honeycomb fired bodies were bonded to one another, thus forming the honeycomb fired bodies into a pillar-shaped body of a quadrangular prism including four pieces in length×four pieces in width. Then, the honeycomb fired bodies were dried at 140° C. for two hours, thus obtaining a quadrangular prism-shaped (quadrangular pillar-shaped) honeycomb bonded assembly.

Afterwards, the outer periphery portion of the obtained quadrangular prism-shaped honeycomb bonded assembly was grinded (processed by griding) such that the honeycomb bonded assembly became a round pillar shape (columnar shape).

Next, 20 parts by mass of mica, 45 parts by mass of SiC, 35 parts by mass of colloidal silica, and, as the superaddition, 1 part by mass of carboxymethylcellulose, 1 part by mass of porinon, 1 part by mass of a foamable resin, and 25 parts by mass of water were kneaded with the mixer. Thus, a paste-like outer circumference coating material was prepared.

The prepared outer circumference coating material was applied over the outer peripheral surface of the "grinded honeycomb bonded assembly" with spatula. Then, the outer circumference coating material was dried by keeping the temperature at 500° C. for two hours, thus obtaining the honeycomb structure.

In the obtained honeycomb structure, the thermal expansion coefficient of the outer circumference coating layer was $7.8 \times 10^{-6} K^{-1}$, and the thermal expansion coefficient of the honeycomb substrate was $4.4 \times 10^{-6} K^{-1}$. That is, at 25 to 800° C., the thermal expansion coefficient of the outer circumference coating layer was larger than the thermal expansion coefficient of the honeycomb substrate, and the value of the thermal expansion coefficient of the outer circumference coating layer/the thermal expansion coefficient of the honeycomb substrate was 1.77. The results are shown in Table 1. In Table 1, the "CTE" means the thermal expansion coefficient (coefficient of thermal expansion).

The thickness of the outer circumference coating layer was 500 μm. The pore diameter of the partition wall of the honeycomb structure was 11 μm and the porosity was 41%. The average pore diameter and the porosity are measured with the mercury porosimeter. The thickness of the partition wall of the honeycomb structure was 300 μm, and the cell density was 46 cells/cm². The bottom surface of the honeycomb structure was a circular shape having a diameter (outer diameter) of 144 mm, and the length of the honeycomb structure in the cell extending direction was 152 mm. The cells at the cross section perpendicular to the cell extending direction of the honeycomb structure have the combination of the quadrangular shape and the octagonal shape. That is, the honeycomb structure in this example had the quadrangular-shaped cells and the octagonal-shaped cells alternately disposed to one another.

The "thermal expansion coefficient" of the obtained honeycomb structures was measured by the following method. The obtained honeycomb structures were evaluated on the respective "Maximum soot deposition temperature (° C.)" and "Maximum soot deposition temperature improvement rate (%)."

(Thermal Expansion Coefficient)

The thermal expansion coefficient of the outer circumference coating layer was measured as follows. First, the outer circumference coating layer is cut out to a sample of a length 1.5 mm×width 15 mm×thickness 0.5 mm. This sample is measured with the thermal expansion coefficient measuring apparatus (TD5000S) available from MAC Science Corporation. Specifically, the sample is heated to 25 to 800° C., and a difference (Δl) between the sample and a standard sample in the thermal expansion coefficient is calculated. A speed of a temperature rise at 25° C. and 800° C. is set to 10° C./minute or less. Then, the thermal expansion coefficient (CTE) is obtained from the following expression (1). Quartz is used as the "standard sample." Thus, the thermal expansion coefficient of the outer circumference coating layer is measured.

$$CTE = \frac{\Delta l}{\Delta t \times L} + Cs \quad (1)$$

In Expression (1), CTE (/° C.) means "thermal expansion coefficient." Δl (mm) means a "difference between the sample and the standard sample in the thermal expansion coefficient." Δt means a "temperature difference between the temperatures at the start of measurement and the end of the measurement", specifically, 800° C.−25° C.=775° C. L means an "overall length of the sample", specifically, 15 mm. Cs (/° C.) means the "thermal expansion coefficient of the standard sample."

The thermal expansion coefficient of the honeycomb substrate was measured as follows. First, similar to the measurement of the thermal expansion coefficient of the outer circumference coating layer, a sample of length 3.5 mm×width 15 mm×thickness 3.5 mm is cut out from the honeycomb substrate. Afterwards, measurement is performed in a similar manner to the measurement of the thermal expansion coefficient of the outer circumference coating layer to measure the thermal expansion coefficient of the honeycomb substrate.

(Maximum Soot Deposition Temperature (° C.))

The "Maximum soot deposition temperature" was measured as follows. A predetermined amount of particulate matter (PM) was deposited on a fabricated honeycomb filter (honeycomb structure), which was operated on an engine bench equipped with a 2.2-L diesel engine. Then, a regeneration process (process using post-injection to burn the PM) was performed to raise a temperature of gas (inlet gas) flown in a honeycomb filter. When pressure loss between the front and the rear of the honeycomb filter (pressure loss between the inlet side and the outlet side of the gas) began to decrease, post-injection was stopped, and the engine was switched to be idled. Then, the aforementioned predetermined amount of PM deposition before the regeneration process was gradually increased, and the same test was repeatedly conducted until the honeycomb filter was cracked. At this time (at the time of generation of crack), a temperature of a center segment near the end face on the outlet side of the exhaust gas of the DPF was measured with a thermocouple. The above-mentioned center segment is a honeycomb segment other than the outer periphery segments constituting the outer peripheral surface of the honeycomb filter. A maximum temperature inside the honeycomb filter in the case that no crack was generated was referred to as the "Maximum soot deposition temperature." In the respective evaluations, the presence/absence of the crack was confirmed by visual check.

(Maximum Soot Deposition Temperature Improvement Rate (%))

The "Maximum soot deposition temperature improvement rate" was calculated. The "Maximum soot deposition temperature improvement rate" means an improvement rate when setting a honeycomb structure of comparative example that uses the same honeycomb substrate, whose "Outer circumference coating layer CTE/honeycomb substrate CTE" is 1.0 or less, and the value is the minimum as 100% (criterion). That is, the "Maximum soot deposition temperature improvement rate" is a rate with respect to 100% improvement rate of a honeycomb structure of a comparative example that uses the same honeycomb structure and has a minimum "Bonding layer CTE/honeycomb substrate CTE" of 1.0 or less. This is because the thermal expansion coefficient of the outer circumference coating layer is conventionally set same as the thermal expansion coefficient of the honeycomb segment or set smaller than the thermal expansion coefficient of the honeycomb segment. For Comparative Examples 2 and 3 and Examples 1 to 5, the "Maximum soot deposition temperature improvement rate" was calculated setting Comparative Example 1 as a criterion. For Examples 6 and 7, the improvement rate was calculated setting Comparative Example 4 as a criterion. For Example 8, the improvement rate was calculated setting Comparative Example 5 as a criterion. For Example 9, the improvement rate was calculated setting Comparative Example 6 as a criterion. If the "Maximum soot deposition temperature improvement rate" is 0% or less, the honeycomb segments, which constitute the honeycomb bonded assembly, are cracked. If the "Maximum soot deposition temperature improvement rate" is more than 0% to less than 1%, an effect of reducing the crack in the honeycomb segments, which constitute the honeycomb bonded assembly, can be confirmed slightly, not remarkably, though. When the "Maximum soot deposition temperature improvement rate" is 1% or more to less than 5%, it can be determined that "the crack at the honeycomb segments constituting the honeycomb bonded assembly can be successfully reduced." Further, in the case of 5% or more, it can be determined that "the crack at the honeycomb segments constituting the honeycomb bonded assembly can be more successfully reduced."

"Cd" indicates the cordierite. "AT" indicates the alumina titanate. "Re—SiC" indicates recrystallized SiC.

Examples 2 to 9 and Comparative Examples 1 to 6

The honeycomb structures were fabricated in a same manner as in Example 1 except that the respective conditions were changed as shown in Table 1. Similar to the case of Example 1, the "thermal expansion coefficient" was measured. The fabricated honeycomb structures were evaluated on the respective "Maximum soot deposition temperature (° C.)" and "Maximum soot deposition temperature improvement rate (%)." The results are shown in Table 1.

From Table 1, it can be seen that the honeycomb structures of Examples 1 to 9 exhibit high "Maximum soot deposition temperature (° C.)" and "Maximum soot deposition temperature improvement rate (%)", and the crack in the honeycomb substrate is reduced.

TABLE 1

| | Outer circumference coating layer | | | | Outer circumference coating layer CTE ($\times 10^{-6}$ K$^{-1}$) | Material of honeycomb substrate | Honeycomb substrate CTE ($\times 10^{-6}$ K$^{-1}$) | Outer circumference coating layer CTE/honeycomb substrate CTE | Maximum soot deposition temperature (° C.) | Maximum soot deposition temperature improvement rate (%) |
|---|---|---|---|---|---|---|---|---|---|---|
| | Kind | Parts by mass | Kind | Parts by mass | | | | | | |
| Comparative Example 1 | Alumina silicate fiber | 25 | — | — | 3.3 | SiC | 4.4 | 0.75 | 1030 | 0 |
| Comparative Example 2 | Alumina thick diameter fiber | 5 | — | — | 3.9 | SiC | 4.4 | 0.89 | 1007 | −2 |
| Comparative Example 3 | Bio-soluble fiber | 35 | — | — | 3.6 | SiC | 4.4 | 0.82 | 1017 | −1 |
| Example 1 | Mica | 20 | — | — | 7.8 | SiC | 4.4 | 1.77 | 1150 | 12 |
| Example 2 | Alumina silicate fiber | 25 | Alumina | 20 | 5.2 | SiC | 4.7 | 1.11 | 1100 | 7 |
| Example 3 | Calcinted mica | 10 | Alumina | 20 | 5.2 | SiC | 4.7 | 1.11 | 1100 | 7 |
| Example 4 | Alumina silicate fiber | 25 | Alumina | 45 | 5.9 | SiC | 4.4 | 1.34 | 1130 | 10 |
| Example 5 | Alumina thick diameter fiber | 5 | Alumina | 45 | 5.9 | SiC | 4.4 | 1.34 | 1130 | 10 |
| Example 6 | Bio-soluble fiber | 35 | Alumina | 45 | 7.3 | SiC | 4.4 | 1.66 | 1150 | 12 |
| Comparative Example 4 | Cd | 100 | — | — | 0.2 | Cd | 0.2 | 1.0 | 980 | 0 |
| Example 7 | Alumina thick diameter fiber | 5 | Alumina | 45 | 5.9 | Cd | 0.2 | 29.5 | 1029 | 5 |
| Example 8 | Mica | 15 | — | — | 7.8 | Cd | 0.2 | 39.0 | 1090 | 11 |
| Comparative Example 5 | AT | 100 | — | — | 1.0 | AT | 1.0 | 1.0 | 1010 | 0 |
| Example 9 | Alumina thick diameter fiber | 5 | Alumina | 45 | 5.9 | AT | 1.0 | 5.9 | 1110 | 10 |
| Comparative Example 6 | Bio-soluble fiber | 35 | — | — | 3.6 | Re—SiC | 4.3 | 0.8 | 1050 | 0 |
| Example 10 | Alumina thick diameter fiber | 5 | Alumina | 45 | 5.9 | Re—SiC | 4.3 | 1.4 | 1110 | 6 |

In Table 1, the "Alumina silicate fiber" indicates a fiber-like substance made of alumina silicate whose representative dimensionis: length of approximately 300 μm and a thickness of 3 μm or less. The "Alumina thick diameter fiber" indicates a fiber-like substance made of alumina whose representative dimension is: length of approximately 300 μm and the thickness of more than 3 μm to 6 μm or less. The "Bio-soluble fiber" indicates a fiber-like substance made of calcia silicate whose representative dimension is: length of approximately 300 μm and the thickness of 3 μm or less.

The honeycomb structure of the present invention can be preferably used as a filter for purifying exhaust gas from, for example, an automobile.

DESCRIPTION OF REFERENCE NUMERALS

1: partition wall, 2: cell, 10: honeycomb substrate, 11: inflow end face, 12: outflow end face, 25: plugging portion, 26: outer circumference coating layer, 100: honeycomb structure

What is claimed is:
1. A honeycomb structure, comprising:
a honeycomb substrate that has a porous partition wall defining a plurality of cells, the cells extending from an inflow end face as one end face to an outflow end face as another end face and becoming channels for a fluid; and an outer circumference coating layer disposed on an outer circumference of the honeycomb substrate, wherein the outer circumference coating layer contains mica, or the outer circumference coating layer contains alumina and at least one kind selected from the group consisting of alumina fiber, calcined mica and bio-soluble fiber, and wherein at 25 to 800° C., a thermal expansion coefficient of the outer circumference coating layer is larger than a thermal expansion coefficient of the honeycomb substrate.

2. The honeycomb structure according to claim 1, wherein the thermal expansion coefficient of the outer circumference coating layer and the thermal expansion coefficient of the honeycomb substrate at 25 to 800° C. meet a relationship represented by Expression: 1.1<(the thermal expansion coefficient of the outer circumference coating layer/the thermal expansion coefficient of the honeycomb substrate)<40.

3. The honeycomb structure according to claim 2, wherein the honeycomb substrate contains at least one kind selected from the group consisting of silicon carbide, alumina titanate, silicon nitride and cordierite.

4. The honeycomb structure according to claim 1, wherein the honeycomb substrate contains at least one kind selected from the group consisting of silicon carbide, alumina titanate, silicon nitride and cordierite.

\* \* \* \* \*